(12) United States Patent  (10) Patent No.: US 6,674,658 B2
Mao et al.  (45) Date of Patent: Jan. 6, 2004

(54) POWER CONVERTER INCLUDING CIRCUITS FOR IMPROVED OPERATIONAL CONTROL OF SYNCHRONOUS RECTIFIERS THEREIN

(75) Inventors: Hengchun Mao, Plano, TX (US); Yimin Jiang, Plano, TX (US)

(73) Assignee: Netpower Technologies, Inc., Plano, TX (US)

( * ) Notice: Subject to any disclaimer, the term of this patent is extended or adjusted under 35 U.S.C. 154(b) by 189 days.

(21) Appl. No.: 10/062,639

(22) Filed: Feb. 1, 2002

(65) Prior Publication Data

US 2002/0110005 A1 Aug. 15, 2002

Related U.S. Application Data

(60) Provisional application No. 60/267,836, filed on Feb. 9, 2001.

(51) Int. Cl.[7] ........................ H02M 3/335; H02M 7/217
(52) U.S. Cl. ................. 363/127; 363/21.06; 363/21.14
(58) Field of Search ............... 363/16, 21.01, 363/21.06, 21.14, 84, 89, 93, 125, 127

(56) References Cited

U.S. PATENT DOCUMENTS 5,590,032 A    12/1996  Bowman et al.
5,625,541 A    4/1997   Rozman
6,134,131 A  * 10/2000  Poon et al. ................. 363/127
6,292,380 B2 * 9/2001   Diallo et al. ................ 363/89

OTHER PUBLICATIONS

W.A. Tabisz, F.C. Lee and D.Y. Chen, "A MOSFET Resonant Synchronous Rectifier for High–Frequency DC/DC Converters" (no date).

* cited by examiner

Primary Examiner—Jessica Han
(74) Attorney, Agent, or Firm—Enrique J. Mora, Esq.; Beusse Brownlee Wolter Mora & Maire, P.A.

(57) ABSTRACT

A power converter device using synchronous rectifiers and method for controlling operation thereof are provided. A first synchronous rectifier is coupled to the secondary transformer winding to pass a voltage induced at the secondary winding in response to an input voltage supplied to the primary transformer winding during an on-state of a main power switch. A first drive circuit is coupled to the gate terminal of the first synchronous rectifier to selectively activate and deactivate the first rectifier in correspondence with the respective on and off states of the main power switch based on a gate voltage supplied by the first drive circuit, with at least one circuit parameter being selected in the first drive circuit for maintaining the gate voltage within a predefined range regardless of variation in the level of the input voltage.

26 Claims, 5 Drawing Sheets

POWER CONVERTER INCLUDING CIRCUITS FOR IMPROVED OPERATIONAL CONTROL OF SYNCHRONOUS RECTIFIERS THEREIN

This application claims the benefit of U.S. patent application Ser. No. 60/267,836 filed on Feb. 9, 2001.

BACKGROUND OF THE INVENTION

The present invention is generally related to control and operation of power converter devices, and, more particularly, to circuits for improving the operational performance of synchronous rectifiers used in DC/DC power converter devices.

DC/DC power converter devices are widely used in numerous applications, such as telecommunications and networking applications. A dc/dc converter is an electronics device that converts a raw dc (direct current) voltage input, usually with a certain variation range, to a dc voltage output that meets a set of specifications. With fast-growing technologies used in telecommunications equipment, the demands on the power density and conversion efficiency of dc/dc converters continue to increase.

FIG. 1 is a schematic diagram of a basic self-driven synchronous rectifier in one exemplary forward converter circuit topology. It is known that under certain conditions, the transformer secondary winding voltage levels could be either too low or too high to appropriately drive the synchronous rectifiers, SR1 and SR2. For example, since the input voltage (Vin) generally changes over a wide range, the driving voltage of the synchronous rectifiers can also change over a wide range. This undesirable voltage level variation for driving the synchronous rectifiers may result in detrimental power losses in the synchronous rectifiers and makes design optimization difficult to achieve. In addition, due to switching delays and other circuit parasitics, there may be an undesirable momentary "on" condition that simultaneously occurs in both synchronous rectifiers SR1 and SR2. This could result in a relatively high spike of current "shooting-through" in at least one of the synchronous rectifiers. Needless to say, such conditions could affect the efficiency, reliability and/or durability of the affected synchronous rectifier and associated components. It is also known to use a separate winding, instead of the main power winding of the power transformer, to drive both synchronous rectifiers SR1 and SR2. However, in such configuration, the charge and discharge of both synchronous rectifiers are inherently interdependent, making the simultaneous turn-on of rectifiers SR1 and SR2 very likely, and, thus, possibly, resulting in a "shoot-through" condition.

Thus, it would be desirable to provide techniques and circuitry that, at relatively low-cost, improve the performance of each self-driven synchronous rectifier (SR) used in dc/dc power converters in order to advantageously reduce power losses and increase the overall efficiency of the power converter. It would be further desirable to provide techniques and circuitry that avoid or alleviate any "shoot-through" conditions in the synchronous rectifiers.

BRIEF SUMMARY OF THE INVENTION

Generally, the present invention fulfills the foregoing needs by providing in one aspect thereof a power converter device including a primary section and a secondary section electromagnetically coupled to one another through a transformer including respective primary and secondary transformer windings. In an exemplary forward converter, the primary section of the power converter includes a main power switch and a clamp switch respectively coupled to the primary transformer winding and configured to generally operate in mutually complementary on and off switching states, with some delays between them to avoid shoot-through and allow a switch's drain-to source voltage to be discharged to a certain degree before it is turned on.

The secondary section of the power converter comprises a first synchronous rectifier coupled to the secondary transformer winding to pass a voltage induced at the secondary winding in response to an input voltage supplied to the primary transformer winding during an on-state of the main power switch. In one exemplary embodiment, a second synchronous rectifier may also be coupled to the secondary transformer winding to pass the voltage induced at the secondary winding when a center-tapped secondary winding is used, or to provide a path to free-wheeling current through an output inductor, if, for example, a single secondary winding is used during the on-state of the clamp switch. A first drive circuit is coupled to the gate terminal of the first synchronous rectifier to selectively activate and deactivate the first rectifier in correspondence with the respective on and off states of the main power switch based on a gate voltage supplied by the first drive circuit, with at least one circuit parameter being selected in the first drive circuit for maintaining the gate voltage within a predefined range over the variation in the level of the input voltage. Generally, the capacitance of a capacitor in the drive circuit is a preferred parameter to losslessly adjust the gate voltage. Moreover, using a capacitor in the drive circuit also allows the gate drive voltage to become proportional to voltage swings in the power transformer, and this reduces gate voltage sensitivity to input voltage variation since voltage swings in the power transformer usually vary over a narrower range than the input voltage. In the event a second synchronous rectifier is used, a second drive circuit is coupled to the gate terminal of the second synchronous rectifier to selectively activate and deactivate the second rectifier in correspondence with the respective on and off states of the clamp switch based on a gate voltage supplied by the second drive circuit, with at least one parameter being selected in the second drive circuit for maintaining the gate voltage within the predefined range regardless of variation in the level of the input voltage. The separation of the current paths for each respective gate drive circuit of the synchronous rectifiers allows substantial flexibility for optimizing their respective switching control timing.

In another aspect of the invention, a circuit for advancing turn-off of the synchronous rectifiers relative to turn-on of either the main power switch, or the clamp switch, or both, may be provided. This circuit is configured to avoid the possibility of a momentary high level of current passing therethrough or reduce its magnitude during a "shoot-through" condition.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
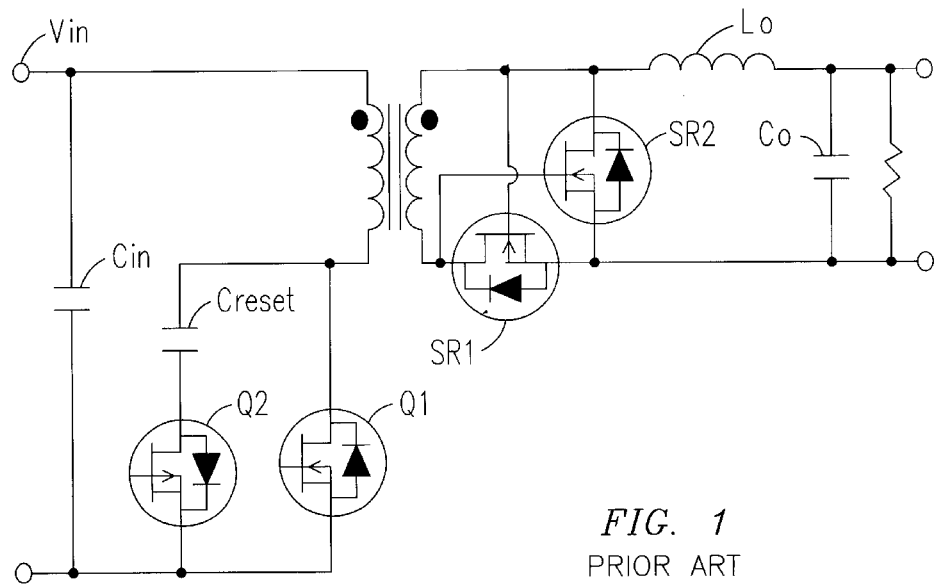
FIG. 1 is a schematic diagram of a basic self-driven synchronous rectifier in one known forward converter circuit topology.
Figure 2:
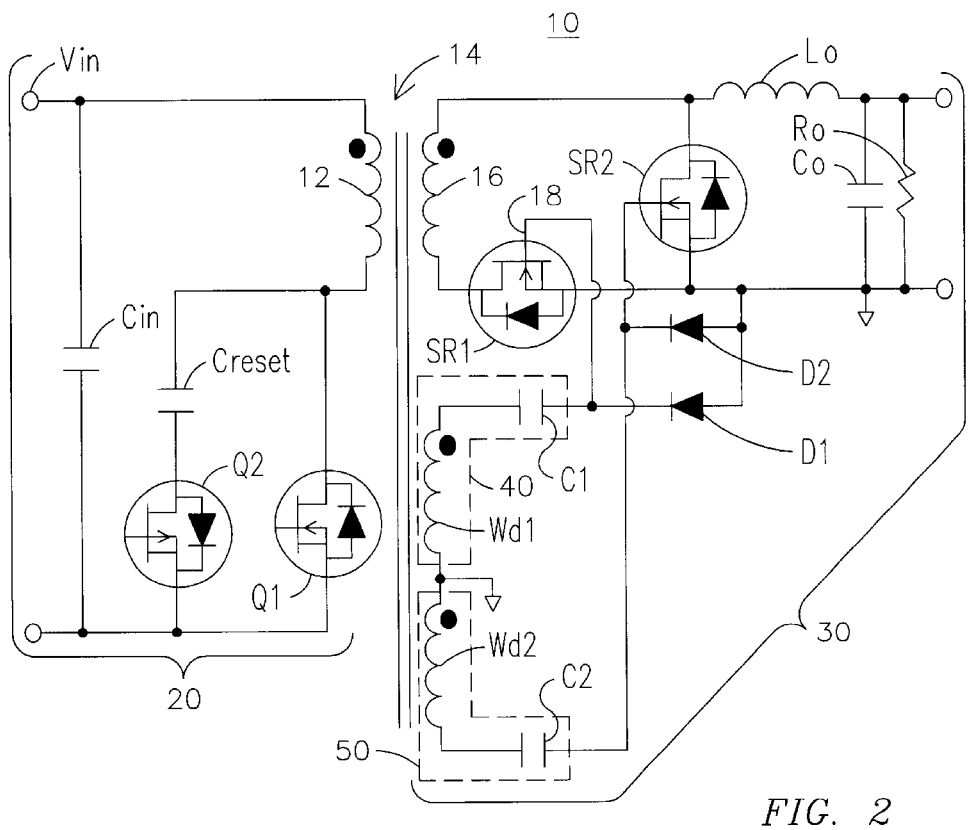
FIG. 2 is a schematic of a power converter embodying aspects of the present invention for controllably driving the synchronous rectifiers with a drive voltage level that is less sensitive to voltage level variation in the input voltage of the power converter.

FIG. 2 shows a schematic of a power converter 10 embodying aspects of the present invention. Power converter 10 includes a primary section 20 and a secondary section 30 electromagnetically coupled to one another through a transformer 14 including respective primary and secondary transformer windings, 12 and 16. The primary section of the power converter includes a main power switch, (first switch Q1) and a clamp switch (second switch Q2) respectively coupled to the primary transformer winding and configured to generally operate in mutually complementary on and off switching states. That is, ideally when power switch Q1 is on, clamp switch Q2 should be off, and conversely when power switch Q1 is off, clamp switch Q2 should be on. As will be appreciated by those skilled in the art, in practice, certain switch delays are commonly included between each respective switching cycle so that a simultaneous on state for both switches can be avoided. Thus, with the appropriate time delay, the voltage across the drain and source terminals of each switch will be discharged to a certain degree prior to its turn-on.

In the embodiment of FIG. 2, when first switch Q1 turns on, the input voltage (Vin) is applied to the primary winding 12 of transformer 14 and, in turn, that input voltage is electromagnetically coupled to the secondary windings 16 of transformer 14. In one exemplary embodiment, first switch Q1 comprises a main power switch, such as an n-channel MOSFET (Metal Oxide Semiconductor Field Effect Transistor) switch. It will be understood, however, that the principles of the present invention are not limited to MOSFET switches since other types of power transistor switches, such as BJTs (Bipolar Junction Transistors), SITs (Static Induction Transistors), IGBTs (Insulated-gate Bipolar Transistors), etc., could be used, depending on the requirements of any given application.

As shown in FIG. 2, a first drive circuit 40 is coupled to the gate terminal of a first synchronous rectifier SR1 to selectively activate and deactivate the first rectifier in correspondence with the respective on and off states of the main power switch Q1 based on a gate voltage supplied by the first drive circuit, with at least one circuit parameter being selected in first drive circuit 40 for maintaining the gate voltage within a predefined range regardless of variation in the level of the input voltage.

In one exemplary embodiment, first drive circuit 40 is made up of a first drive winding Wd1 electromagnetically coupled to the transformer, and is further made up of a first capacitor C1 connected with the gate terminal of the first synchronous rectifier. The voltage that develops across first drive winding (Wd1) results in a positive voltage being applied through first capacitor C1 to the gate 18 of a first synchronous rectifier SR1. It can be shown that the voltage amplitude at gate 18 is essentially determined by the voltage swing on the winding Wd1 and the ratio of the capacitance of capacitor C1 and the effective gate capacitance of synchronous rectifier SR1. In most cases, the range of this voltage swing is narrower than the input voltage range. In practical devices, the effective gate capacitance of a MOSFET device generally increases when its drain to source voltage increases due to a phenomenon called "Miller Effect." This phenomenon results in less sensitivity in variation of gate drive voltage relative to input line variation, and further improves the converter performance. Thus, in one aspect of the present invention, with a proper selection of at least one circuit parameter, such as the number of turns of first drive winding Wd1, or the capacitance value of capacitor C1, or both, the gate voltage on synchronous rectifier SR1 will be maintained within an appropriate range over the full input range. As will be appreciated by those skilled in the art, in a practical implementation adjusting the capacitance value of the capacitor may be easier to achieve and more effective as compared to adjusting the number of turns in the winding. It will be understood, however, that the present invention contemplates that, depending on the requirements of any given application; any, or both, circuit parameters could be used for achieving the appropriate gate voltage.

As further shown in FIG. 2, a second drive circuit 50, made up of a second drive winding Wd2 and a second capacitor C2, is coupled to the gate terminal of a second synchronous rectifier SR2 to selectively activate and deactivate the second rectifier in correspondence with the respective on and off states of the clamp switch Q2 based on a gate voltage supplied by the second drive circuit, with at least one circuit parameter being selected in second drive circuit 50 for maintaining the gate voltage within a predefined range regardless of variation in the level of the input voltage. For example, upon first switch Q1 turning on, the voltage on a second drive winding (Wd2) charges second capacitor C2 first through the gate capacitance of second synchronous rectifier SR2 and then through a diode D2. Synchronous rectifier SR2 is turned off when its gate voltage falls below its threshold level. When first switch Q1 turns off and second switch Q2, turns on, the polarity of the voltage on the transformer primary winding 14 is reversed and so is the voltage polarity on the secondary winding. The voltage on drive winding Wd2 in this case will apply a positive voltage through capacitor C2 to the gate of synchronous rectifier SR2 to turn on that synchronous rectifier. Again, proper selection of the number of turns of second drive winding Wd2 and/or the capacitance value of capacitor C2 will ensure an appropriate level of drive voltage for synchronous rectifier SR2 over the full input range.

Upon second switch Q2 turning on, the gate of synchronous rectifier SR1 is discharged by the voltage on drive winding Wd1 in a similar manner as occurs to the gate of synchronous rectifier SR2 during the preceding period. That is, upon first switch Q1 turning on. In another aspect of the present invention, as discussed in greater detail below, using first and second drive windings Wd1 and Wd2 to separate the driving current paths for the synchronous rectifiers SR1 and SR2 advantageously allows to fine-tune the driving timing of synchronous rectifiers SR1 and SR2 separately, and thus to further improve the converter efficiency.

Figure 3:
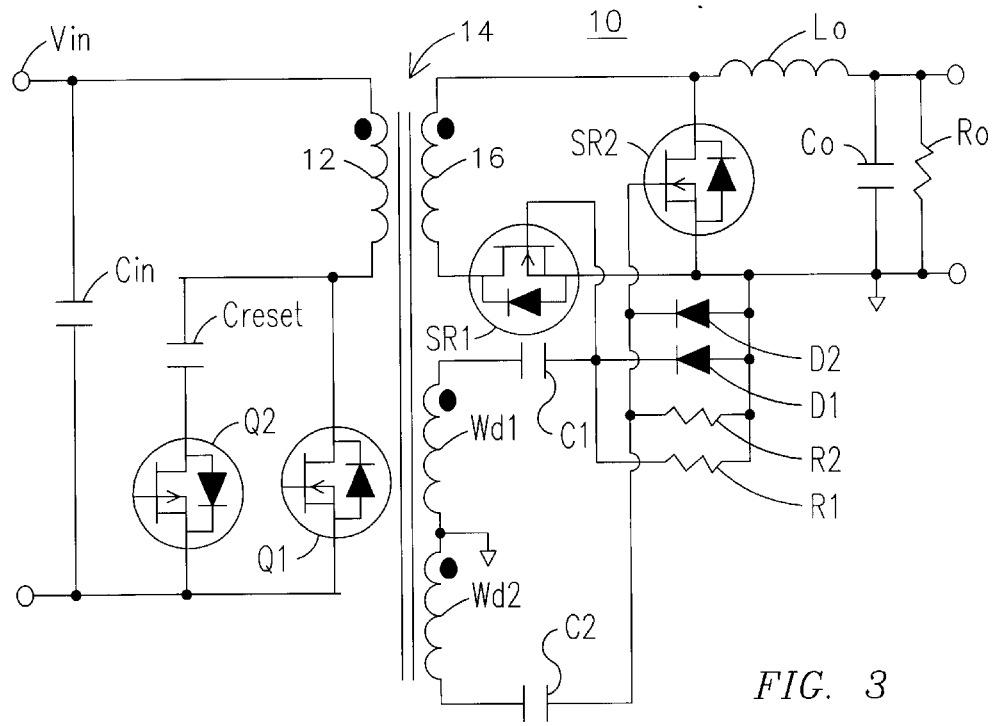
FIG. 3 is a schematic of a first exemplary variation of the power converter embodiment of FIG. 2 that includes discharge resistors.

To ensure that the gate voltages of synchronous rectifier SR1 and SR2 actually remain off during their respective "off" state, a pair of discharge resistors R1 and R2 may be optionally connected to the respective gates of synchronous rectifier SR1 and SR2, as shown in FIG. 3. As will be appreciated by those skilled in the art, resistor pair R1 and R2 allows discharging electrical charges that may build-up on the respective gates of synchronous rectifier SR1 and SR2, which otherwise could result in incorrectly actuating any of the synchronous rectifiers to the "on" state.

Figure 4:
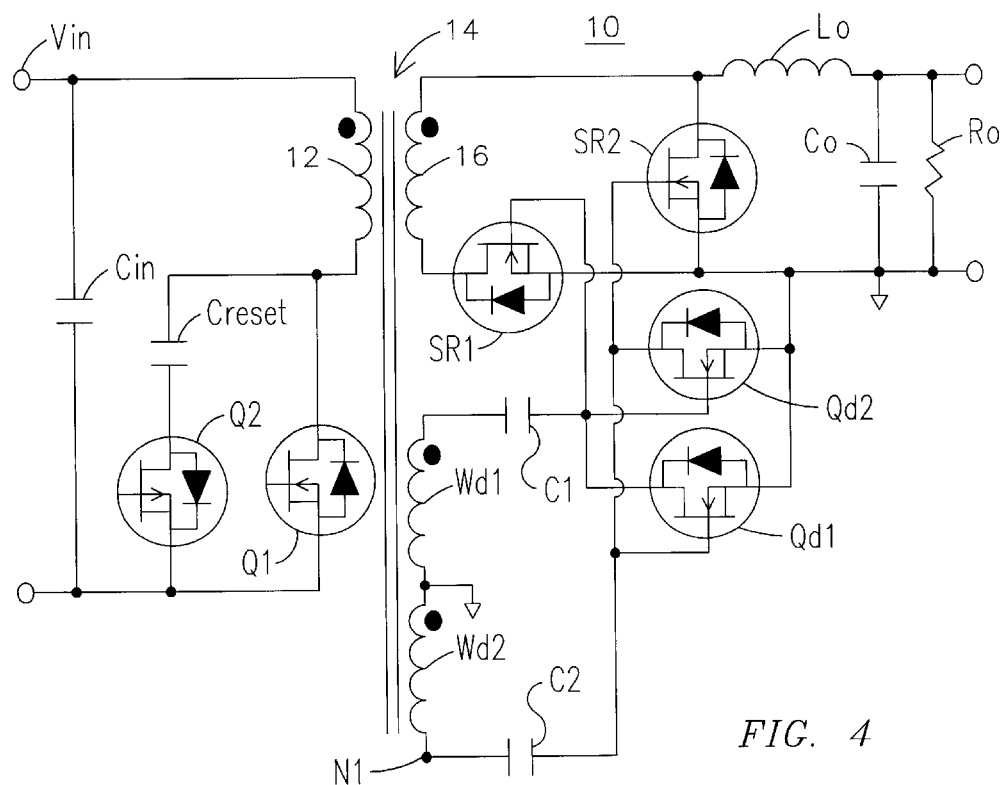
FIG. 4 is a schematic of a second exemplary variation of the power converter embodiment of FIG. 2 that includes discharge switches for ensuring the synchronous rectifiers remain off during their respective off-state.

In another aspect of the invention, first and second discharge switches Qd1 and Qd2 may be optionally connected to the gates of synchronous rectifiers SR1 and SR2 as shown in FIG. 4. As will be appreciated by those skilled in the art, discharge switches Qd1 and Qd2 operate to provide a discharge path for the respective gates of synchronous rectifiers SR1 and SR2 when such rectifiers are set to the "off" state. For example, when the voltage provided by drive winding Wd1 through capacitor C1 is at a high level, the gate terminal of discharge switch Qd2 is also charged to a high level and that discharge switch is set to the "on"state, then the gate terminal of synchronous rectifier SR2 is provided with a discharge path through discharge switch Qd2. Similarly, when a positive voltage higher than the gate threshold voltage of discharge switch Qd1 is provided by drive winding Wd2, through capacitor C2, to the gate terminal of discharge switch Qd1 and that discharge switch is set to the "on" state, the gate terminal of synchronous rectifier SR1 is also advantageously provided with a discharge path through discharge switch Qd1. In one exemplary embodiment, assuming the discharge switches Qd1 and Qd2 comprise MOSFET switches, then the diodes D2 and D1 shown in FIGS. 2 and 3 would be integrally embedded within discharge switches Qd1 and Qd2 as shown in FIG. 4. As suggested above, the discharge resistors R1 and R2, discussed in the context of FIG. 3, can also be optionally added to ensure even a better discharge of electrical charges that may otherwise build-up on the respective gates of synchronous rectifiers SR1 and SR2 and cause inappropriate activation to the "on" state.

As will be appreciated by those skilled in the art, in each of the above circuits, a respective pair of dampening resistors (not shown) may be each connected in series with capacitors C1 and C2 to reduce the rate of change of current (di/dt), and thus reducing the level of electromagnetic interference (EMI), and providing some desirable damping effects to the drive circuit.

In some designs where the leakage inductance of transformer 14 is relatively small, as suggested above, the foregoing circuits could experience a brief but undesirable "shoot-through" period upon turn-on of power switch Q1. More specifically, when power switch Q1 is turned on, assuming essentially instantaneous turn on, the voltage on the transformer primary winding 14 is the input voltage, which would be coupled to the secondary power winding 16 and to drive windings Wd1 and Wd2. Since in any physically-realizable implementation, the gate voltage on synchronous rectifier SR2 and the voltage on capacitor C2 physically require a finite amount of time to be respectively discharged and charged due to some non-zero impedance in the path, there could be a brief period of time where the secondary winding voltage is positive while synchronous rectifier SR2 momentarily still is in a respective "on" state. As suggested above, this condition is referred to as a "shoot-through" condition and, as a result, the current through synchronous rectifier SR2 and first switch Q1 would quickly rise until synchronous rectifier SR2 is turned off. As will be appreciated by those skilled in the art, the amplitude of the current spike would be determined by the duration of the "shoot-through" condition, the magnitude of the input voltage and the amount of impedance in the path.

Figure 5:
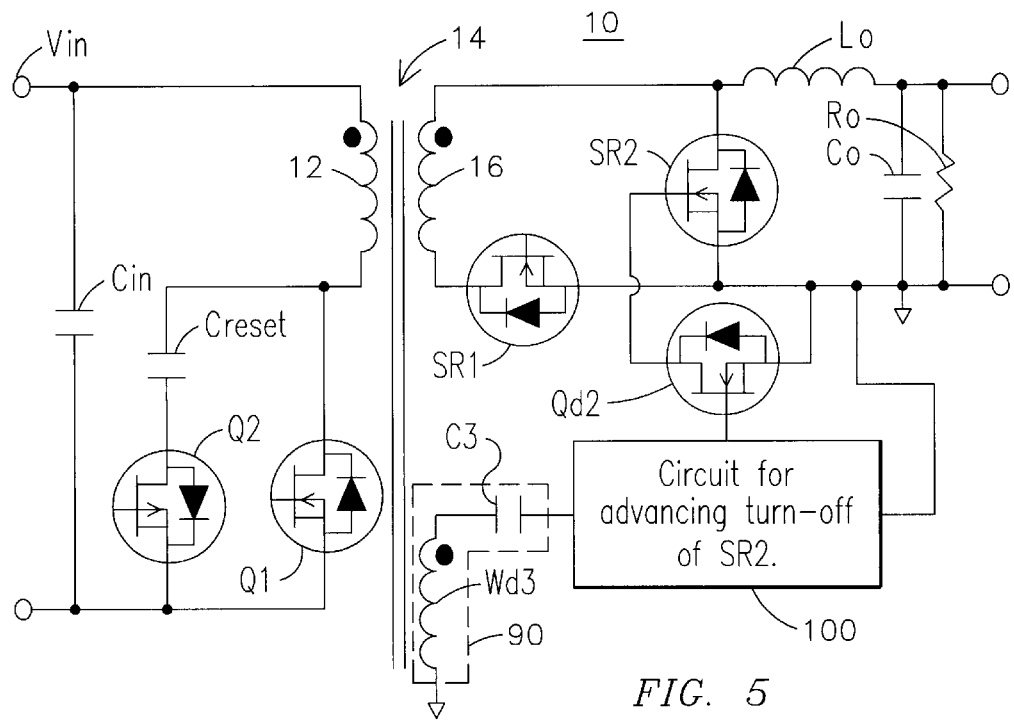
FIG. 5 is a schematic of a power converter embodying additional aspects of the present invention for dynamically advancing the turn-off of one of the synchronous rectifiers (SR2) relative to the turn-on of a power switch in the power converter.

To eliminate or substantially reduce this "shoot-through" condition, in one exemplary embodiment, it is desirable for synchronous rectifier SR2 to be turned off slightly ahead of the turn-on of synchronous rectifier SR1. The embodiment shown in FIG. 5 provides a circuit 100 for dynamically advancing the turn-off of synchronous rectifier SR2 relative to the turn-on of power switch Q1, assuming an exemplary active-clamped forward converter topology. Note that drive windings Wd1 and Wd2 and associated components shown in the previous figures are not shown in FIG. 5 for the sake of avoiding visual cluttering. It will be understood, however, that drive windings Wd1 and Wd2 and associated components would be part of the circuit illustrated in FIG. 5. As shown at FIG. 5, a drive circuit 90, such as made up of a third drive winding Wd3 and a third capacitor C3, would be connected to the synchronous rectifier. In one exemplary embodiment, third drive winding Wd3 could be stacked on drive winding Wd1 to reduce the number of turns of winding Wd3, if so needed. An additional advance-switching circuit (not shown), essentially the same as circuit 100, can also be provided for synchronous rectifier SR1.

In an active-clamped forward converter, in general, clamp switch Q2 is turned off prior to the turn on of the main switch Q1. In one aspect of the present invention, the inventors of the present invention innovatively recognized that such characteristic could be advantageously used to achieve the desired turn-off advance of synchronous rectifier SR2 relative to the turn-on of the main power switch Q1. For example, when switch Q2 turns off, the voltage on the transformer primary winding 14 will change with the magnetizing current of the transformer discharging the drain-to-source capacitance of switch Q1. During this period, the voltage across the primary winding of transformer T1 changes from a negative value towards a zero value. With the above-described positive rate of change of dv/dt (even though the absolute value of the discharge voltage may still be negative), and a positive voltage on capacitor C3, assuming such capacitor is pre-charged to an appropriate level, a positive voltage can be coupled to the gate of discharge switch Qd2 and thus discharge the gate of synchronous rectifier SR2. This action would allow turning off synchronous rectifier SR2 without having to wait for the turn-on of switch Q1. As suggested above, in one exemplary embodiment, synchronous rectifier SR1 would not be responsive to the foregoing action and thus would not be turned on at the moment synchronous rectifier SR2 is turned off, and, thus, a controllable delay is effectively provided between SR2's turn-off and SR1's turn-on, and, as a result, shoot-through would be avoided or alleviated.

Figure 6:
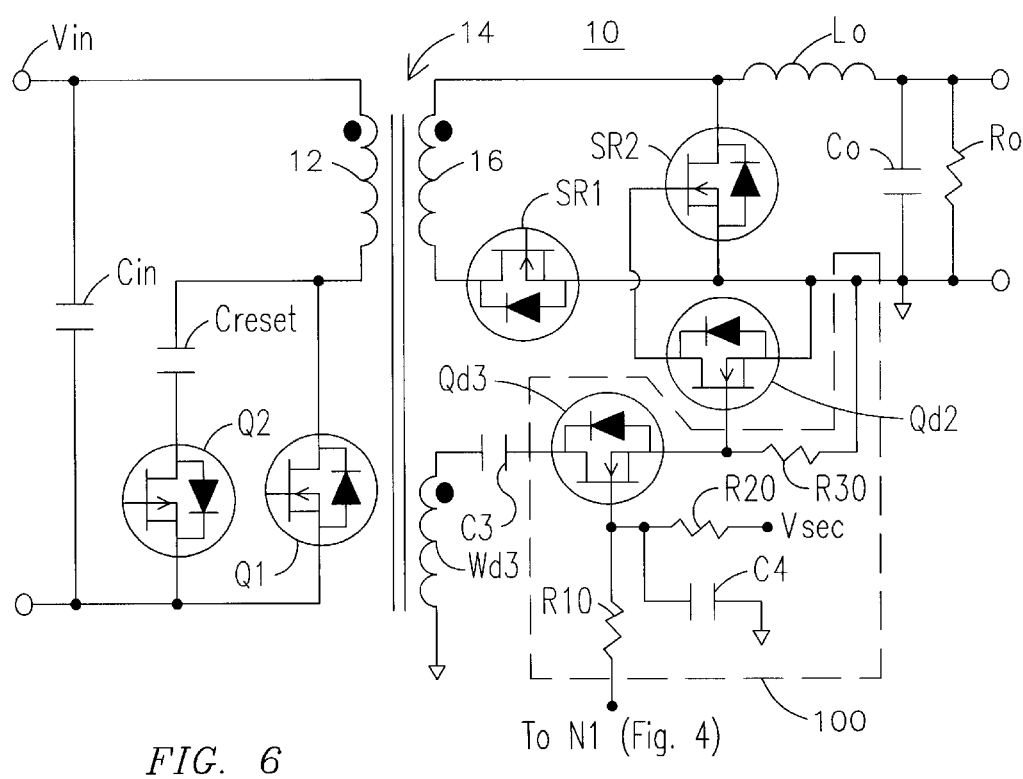
FIG. 6 illustrates a schematic of an exemplary circuit that allows advancing the turn-off of synchronous rectifier SR2 relative to the turn-on of the power switch in the power converter of FIG. 5.

A detailed circuit implementation of an exemplary embodiment for the circuit 100 discussed in the context of FIG. 5 is shown in FIG. 6. A respective discharge switch Qd3 including respective gate, source, and drain terminals is provided, and drive circuit 90 is coupled to the transformer to supply a positive voltage to the source terminal of discharge switch Qd3 when needed. Capacitor C3 provides a positive voltage to the drain of discharge switch Qd3 when a positive pulse is needed to turn on discharge switch Qd2. The gate terminal of the discharge switch Qd3 is coupled to the second drive circuit at node N1, for example, to sense a voltage change induced when the clamp switch is turned off. The gate terminal of discharge switch Qd3 is further biased so that the voltage change induced when the clamp switch turns off results in a gate voltage level that causes switch Qd3 to be activated into a respective on-state to pass the positive voltage to the gate of the second discharge switch Qd2 and provide through the second discharge switch a discharge path to the gate of the second synchronous rectifier SR2, thus ensuring turn-off of that second synchronous rectifier prior to turn-on of the first synchronous rectifier SR1 and avoid any possibility of a momentary high level of current passing therethrough during the "shoot-through" condition.

In the exemplary embodiment illustrated in FIG. 6, Vsec represents a bias voltage applied through a resistor R20. As suggested above, discharge switch Qd3 allows providing the following functions: First, discharge switch Qd3 provides control of the voltage applied to the gate of second discharge switch Qd2 based on the voltage at the gate of switch Qd3. Further, discharge switch Qd3 is turned off shortly after a positive voltage is applied to the gate of discharge switch Qd2. In one exemplary embodiment, the way third discharge switch Qd3 is turned off is through the pull-down of voltage through node N1 (FIG. 4). That is, a connection at node N1 allows coupling the voltage provided by drive winding Wd2 to circuit 100 through resistor R10. A capacitor C4 provides the capability to adjust the on-time of third discharge switch Qd3. Once third discharge switch Qd3 is off, the gate of the second discharge switch Qd2 is discharged through resistor R30 and would be set below the gate threshold of second discharge switch Qd2 before the next switching event.

Figure 7:
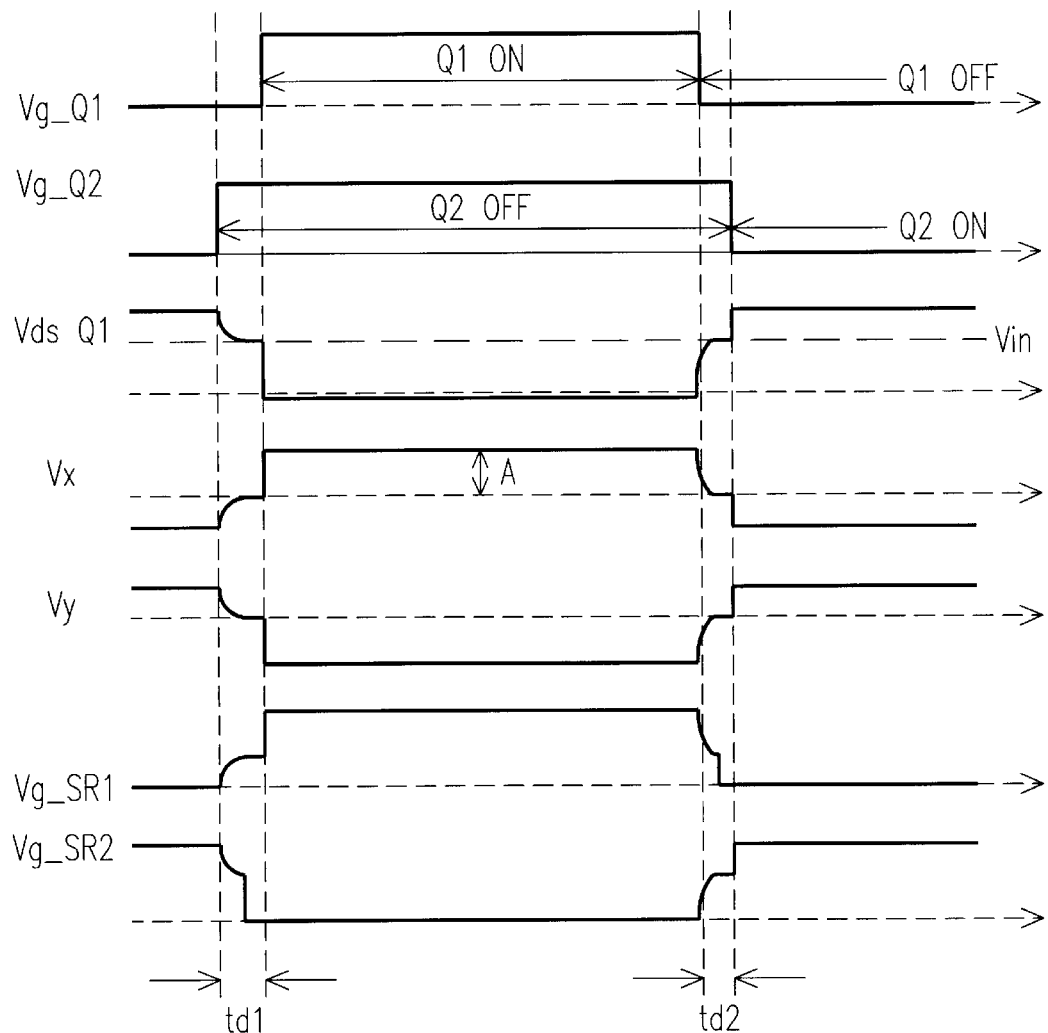
FIG. 7 illustrates exemplary plots of some waveforms for the power converter embodiment of FIG. 4.

FIG. 7 illustrates exemplary plots of some waveforms for the power converter embodiment of FIG. 4. Vg_Q1 and Vg_Q2 represent exemplary gating signals respectively applied to power switch Q1 and clamp switch Q2. V_x represents the voltage at the junction of winding wd1 and capacitor C1; V_y represents the voltage at the junction of winding wd2 and capacitor C2. All voltages are reference to source terminals of synchronous rectifiers SR1 and SR2.

As suggested above, the respective gating voltage levels of Vg_SR1 and Vg_SR2 for synchronous rectifiers SR1 and SR2 are respectively determined by the product of the voltage swing of the corresponding drive winding (wd1 and wd2) and the ratio of the capacitance of C1/Cg_SR1 and C2/Cg_SR2. For instance, if the positive voltage swing is 10V on wd1, and C1=Cg_SR1, then the amplitude of Vg_SR1 will be 5V. The voltage swing is the amplitude of Vds_Q1 times the turns-ratio of the transformer.

As further suggested above, if the actual turn-off of synchronous rectifier SR2 was to occur at or after the turn-on of SR1, due to the finite turn-off speed of physical devices and other parasitic components in the circuit, there could be a brief "shoot-through" period before synchronous rectifier SR2 is fully turned off, which would cause shorting of the transformer secondary and therefore a high current spike. This shoot-through condition, under certain conditions, could impair the performance of the power converter, prevent the converter from normal operation, or even destroy some components.

Figure 8:
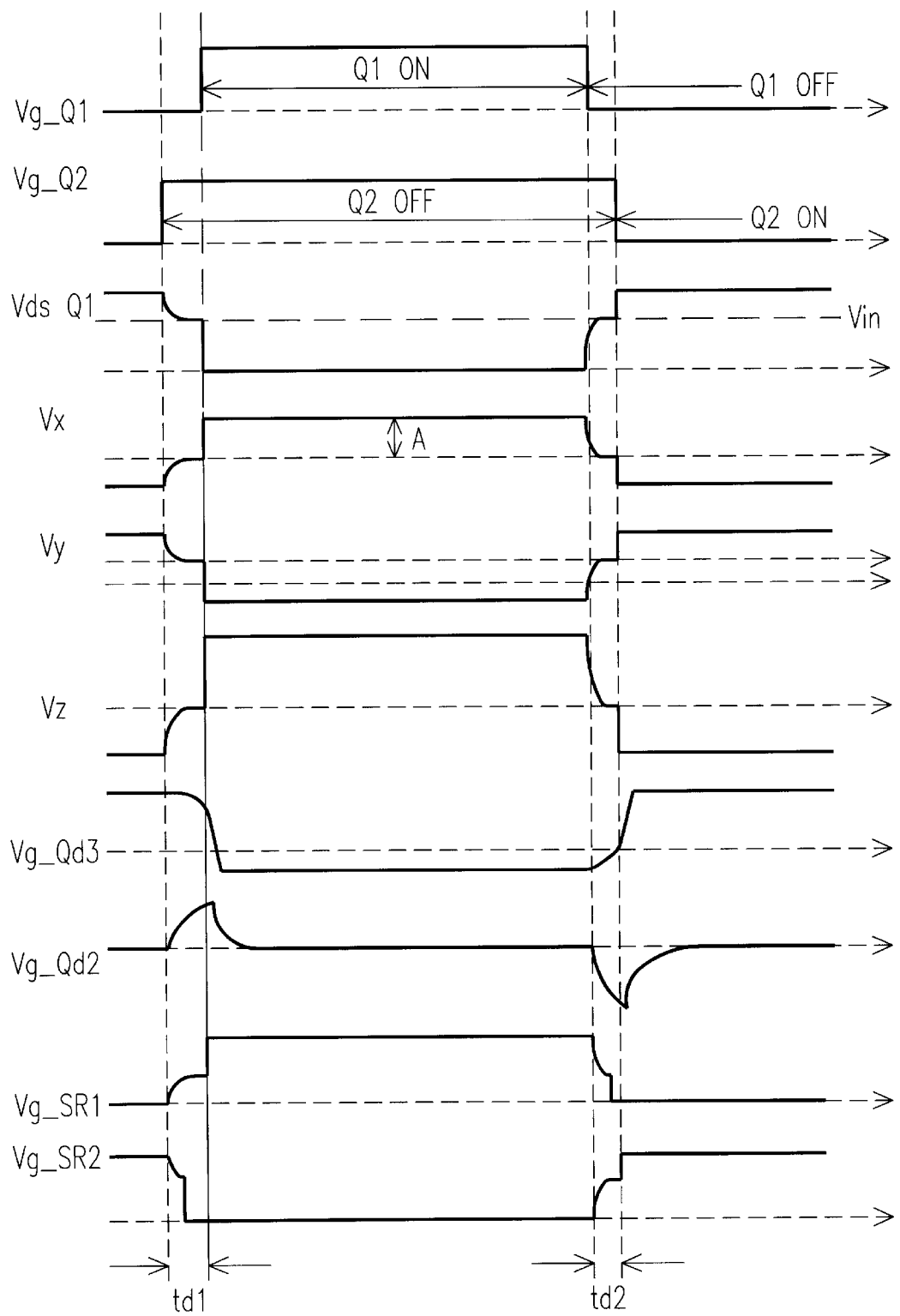
FIG. 8 illustrates exemplary plots of some waveforms for the power converter embodiment of FIG. 6.

FIG. 8 illustrates plots of waveforms for the power converter embodiment of FIG. 6. V_z represents the voltage at the junction of winding wd3 and capacitor C3. If the voltage amplitude on first drive winding wd1 is enough, third drive winding wd3 may not be necessary. If so, capacitor C3 would be connected to first drive winding wd1. Vg_Qd3 and Vg_Qd2 represent the respective gating signals applied to discharge switches Qd3 and Qd2. As illustrated in FIG. 8, the plot of the gating signal Vg_SR2 indicates that the turn off of such rectifier would be advanced, likely before the turn-on of switch Q1, which makes this technique even advantageously usable for flyback converters made up of only a single secondary synchronous rectifier, in a controlled manner and this would avoid the possibility of high level current spikes that otherwise could have occurred in the "shoot-through" condition.

As will be now appreciated by those skilled in the art, the same principles discussed above can be easily applied to other converter topologies, such as flyback converters, half-bridge converters and full bridge converters. Although a centertapped secondary winding and a larger number of synchronous rectifiers may be used in these relatively more complex topologies, the requirements of the synchronous rectifiers in those topologies are essentially the same as those used in the exemplary forward converter topology, and thus the techniques and circuits presented herein can also advantageously improve their performance.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power converter device including a primary section and a secondary section electromagnetically coupled to one another through a transformer including respective primary and secondary transformer windings, the power converter comprising:

at least a first synchronous rectifier coupled to the secondary transformer winding to pass a voltage induced at said secondary winding in response to an input voltage supplied to the primary transformer winding during an on-state of a main power switch coupled to the primary transformer winding; and a first drive circuit coupled to the gate terminal of the first synchronous rectifier to selectively activate and deactivate the first rectifier in correspondence with respective on and off states of the main power switch based on a gate voltage supplied by said first drive circuit, with at least one circuit parameter being selected in said first drive circuit for maintaining the gate voltage within a predefined range regardless of variation in the level of the input voltage.

2. The power converter device of claim 1 further comprising a second synchronous rectifier coupled to the secondary transformer winding to pass voltage induced at said secondary winding during an on-state of a clamp switch coupled to the primary transformer winding; and a second drive circuit coupled to the gate terminal of the second synchronous rectifier to selectively activate and deactivate the second rectifier in correspondence with the respective on and off states of the clamp switch based on a gate voltage supplied by said second drive circuit, with at least one parameter being selected in said second drive circuit for maintaining the gate voltage within the predefined range regardless of variation in the level of the input voltage.

3. The power converter device of claim 2 further comprising a first discharge switch having a gate terminal coupled to the second drive circuit to dynamically provide through said first discharge switch, during a mode of operation corresponding to an off-state of the first synchronous rectifier, a discharge path to the gate of the first synchronous rectifier, thus ensuring said first synchronous rectifier remains off during its respective off-state.

4. The power converter device of claim 3 further comprising a second discharge switch having a gate terminal coupled to the first drive circuit to dynamically provide through said second discharge switch, during a mode of operation corresponding to an off-state of the second synchronous rectifier, a discharge path to the gate of the second synchronous rectifier, thus ensuring said second synchronous rectifier remains off during its respective off-state.

5. The power converter device of claim 2 wherein the second drive circuit comprises a second drive winding electromagnetically coupled to the transformer, and further comprises a second capacitor connected with the gate terminal of the second synchronous rectifier.

6. The power converter device of claim 5 wherein the at least one circuit parameter for maintaining the gate voltage within the predefined range is selected from the group consisting of number of turns of the second drive winding, and capacitance value of the second capacitor.

7. The power converter device of claim 2 further comprising a second discharge resistor coupled to provide a discharge path to the gate of the second synchronous rectifier.

8. The power converter device of claim 2 further comprising a circuit for advancing turn-off of the second synchronous rectifier relative to turn-on of the main power switch, and avoid any possibility of a momentary high level of current passing therethrough during a "shoot-through" condition.

9. The power converter device of claim 8 wherein turn-off of the clamp switch is configured to lead turn-on of the main power switch by a predefined time interval.

10. The power converter device of claim 9 wherein the circuit for advancing turn-off of the second synchronous rectifier comprises a respective transistor switch including respective gate, source, and drain terminals, and a drive circuit electromagnetically coupled to the transformer to supply a positive voltage to the source terminal of the transistor switch during the on-state of the main power switch, the gate terminal of the transistor switch being coupled to the second drive circuit to sense a voltage change induced when the clamp switch is turned off, the gate terminal of the transistor switch being further biased so that the voltage change induced when the clamp switch turns off results in a gate voltage level that causes the transistor switch to be activated into a respective on-state to pass the positive voltage to the gate of the second discharge switch and provide through said second discharge switch a discharge path to the gate of the second synchronous rectifier, thus ensuring turn-off of that second synchronous rectifier prior to turn-on of the main power switch and avoid any possibility of a momentary high level of current passing therethrough during the "shoot-through" condition.

11. The power converter device of claim 1 wherein the first drive circuit comprises a first drive winding electromagnetically coupled to the transformer, and further comprises a first capacitor connected with the gate terminal of the first synchronous rectifier.

12. The power converter device of claim 11 wherein the at least one circuit parameter for maintaining the gate voltage within the predefined range is selected from the group consisting of number of turns of the first drive winding, and capacitance value of the first capacitor.

13. The power converter device of claim 1 further comprising a first discharge resistor coupled to provide a discharge path to the gate of the first synchronous rectifier.

14. A method for controlling a power converter device including a primary section and a secondary section electromagnetically coupled to one another through a transformer including respective primary and secondary transformer windings, the method comprising:

coupling at least a first synchronous rectifier to the secondary transformer winding to pass a voltage induced at said secondary winding in response to an input voltage supplied to the primary transformer winding during an on-state of a main power switch; and coupling a first drive circuit to the gate terminal of the first synchronous rectifier to selectively activate and deactivate the first rectifier in correspondence with respective on and off states of the main power switch based on a gate voltage supplied by said first drive circuit; and selecting at least one circuit parameter in said first drive circuit for maintaining the gate voltage within a predefined range regardless of variation in the level of the input voltage.

15. The method of claim 14 further comprising:

coupling a second synchronous rectifier to the secondary transformer winding to pass the voltage induced at said secondary winding during an on-state of a clamp switch coupled to the primary transformer winding;

coupling a second drive circuit to the gate terminal of the second synchronous rectifier to selectively activate and deactivate the second rectifier in correspondence with the respective on and off states of the clamp switch based on a gate voltage supplied by said second drive circuit; and selecting at least one parameter in said second drive circuit for maintaining the gate voltage within the predefined range regardless of variation in the level of the input voltage.

16. The method of claim 15 further comprising coupling a second discharge resistor to provide a discharge path to the gate of the second synchronous rectifier.

17. The method of claim 15 wherein the respective current paths for each respective gate coupled to drive the synchronous rectifiers are electrically separate from one another, thus enabling substantially independent control of their respective switching control timing.

18. The method of claim 15 further comprising configuring the second drive circuit to include a second drive winding electromagnetically coupled to the transformer, and further including a second capacitor connected with the gate terminal of the second synchronous rectifier.

19. The method of claim 18 wherein the at least one circuit parameter for maintaining the gate voltage within the predefined range is selected from the group consisting of number of turns of the second drive winding, and capacitance value of the second capacitor.

20. The method of claim 15 further comprising providing, during a mode of operation corresponding to an off-state of the first synchronous rectifier, a discharge path to the gate of the first synchronous rectifier, thus ensuring said first synchronous rectifier remains off during its respective off-state.

21. The method of claim 20 further comprising providing, during a mode of operation corresponding to an off-state of the second synchronous rectifier, a discharge path to the gate of the second synchronous rectifier, thus ensuring said second synchronous rectifier remains off during its respective off-state.

22. The method of claim 21 further comprising advancing turn-off of the second synchronous rectifier relative to turn-on of the main power switch, and avoid any possibility of a momentary high level of current passing therethrough during a "shoot-through" condition.

23. The method of claim 22 wherein turn-off of the clamp switch is configured to lead turn-on of the power switch by a predefined time interval.

24. The method of claim 14 further comprising configuring the first drive circuit to include a first drive winding electromagnetically coupled to the transformer, and further including a first capacitor connected with the gate terminal of the first synchronous rectifier.

25. The method of claim 24 wherein the at least one circuit parameter for maintaining the gate voltage within the predefined range is selected from the group consisting of number of turns of the first drive winding, and capacitance value of the first capacitor.

26. The method of claim 14 further comprising coupling a first discharge resistor to provide a discharge path to the gate of the first synchronous rectifier.

* * * * *